(12) United States Patent
Koike

(10) Patent No.: US 10,359,275 B2
(45) Date of Patent: Jul. 23, 2019

(54) HOLDING APPARATUS, MEASUREMENT APPARATUS, AND ARTICLE MANUFACTURING METHOD

(71) Applicant: CANON KABUSHIKI KAISHA, Tokyo (JP)

(72) Inventor: Kana Koike, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 15/496,169

(22) Filed: Apr. 25, 2017

(65) Prior Publication Data

US 2017/0307364 A1 Oct. 26, 2017

(30) Foreign Application Priority Data

Apr. 26, 2016 (JP) ................................ 2016-088224

(51) Int. Cl.
*G01B 11/25* (2006.01)
*G02B 26/08* (2006.01)

(52) U.S. Cl.
CPC .......... *G01B 11/25* (2013.01); *G02B 26/0833* (2013.01)

(58) Field of Classification Search
None
See application file for complete search history.

(56) References Cited

U.S. PATENT DOCUMENTS

| 8,919,962 B2 * | 12/2014 | Aikoh | G03B 21/2073 |
| | | | 348/751 |
| 2007/0159674 A1 * | 7/2007 | Tomita | H04N 1/032 |
| | | | 359/201.1 |

| 2011/0164114 A1 | 7/2011 | Kobayashi et al. |
| 2017/0328705 A1 | 11/2017 | Kubo |

FOREIGN PATENT DOCUMENTS

| JP | 2002365612 A | 12/2002 |
| JP | 2003161701 A | 6/2003 |

OTHER PUBLICATIONS

Office Action issued in U.S. Appl. No. 15/589,234 dated Feb. 15, 2019.

* cited by examiner

*Primary Examiner* — Jennifer D. Carruth
(74) *Attorney, Agent, or Firm* — Rossi, Kimms & McDowell LLP

(57) ABSTRACT

There is provided a holding apparatus for holding an optical element, that comprises: a positioning member configured to position first and second sides of the optical element adjacent to each other; a first elastic member supported by the positioning member and configured to apply a biasing force to a third side of the optical element opposite to the first side; and a second elastic member supported by the positioning member and configured to apply a biasing force to a fourth side of the optical element opposite to the second side, wherein the first and second elastic members are configured such that a difference between linear expansion amounts of the first elastic member and the optical element and a difference between linear expansion amounts of the second elastic member and the optical element are both not greater than a threshold.

10 Claims, 5 Drawing Sheets

HOLDING APPARATUS, MEASUREMENT APPARATUS, AND ARTICLE MANUFACTURING METHOD

BACKGROUND OF THE INVENTION

Field of the Invention

The present disclosure relates to a holding apparatus, a measurement apparatus, and an article manufacturing method.

Description of the Related Art

As an apparatus for measuring a shape of an object, a measurement apparatus using a pattern projection method is known. The pattern projection method finds the shape of an object by projecting a pattern onto the object, imaging the object, detecting a pattern in the captured image, and obtaining distance information in each pixel position according to the principle of triangulation.

The pattern to be projected is generated by, for example, illuminating an element having a function of spatially controlling transmittance or reflectance of light using an illumination optical system. The generated pattern is projected to the object through a projection optical system. The projected pattern can be changed if positional relationships between the illumination optical system, the element and the projection optical system change due to the influence of an environmental temperature. Therefore, in the holding apparatus in Japanese Patent Laid-Open No. 2002-365612, a movement direction of an element in a storage unit is defined as one direction, and the stability of a position of the element against change in temperature increases.

However, in the holding apparatus in Japanese Patent Laid-Open No. 2002-365612, since an influence of friction between the element and the storage unit is not considered, the reproducibility of the position of the element can be decreased by a frictional force applied therebetween if the change in the temperature causes the element and the storage unit to be expanded or contracted.

SUMMARY OF THE INVENTION

The present disclosure provides, for example, a holding apparatus advantageous in reproducibility of a position of an object held thereby.

According to an aspect of the present disclosure, a holding apparatus for holding an optical element is provided, the apparatus comprising: a positioning member configured to position a first side and a second side of the optical element, which are adjacent to each other; a first elastic member supported by the positioning member and configured to apply a biasing force to a third side of the optical element opposite to the first side; and a second elastic member supported by the positioning member and configured to apply a biasing force to a fourth side of the optical element opposite to the second side, wherein the first elastic member and the second elastic member are configured such that a difference between a linear expansion amount of the first elastic member and a linear expansion amount of the optical element and a difference between a linear expansion amount of the second elastic member and the linear expansion amount of the optical element are both not greater than a threshold.

Further features of the present disclosure will become apparent from the following description of exemplary embodiments with reference to the attached drawings.

DESCRIPTION OF THE EMBODIMENTS

Hereinafter, embodiments of the present disclosure will be described with reference to the drawings.

Figure 1:
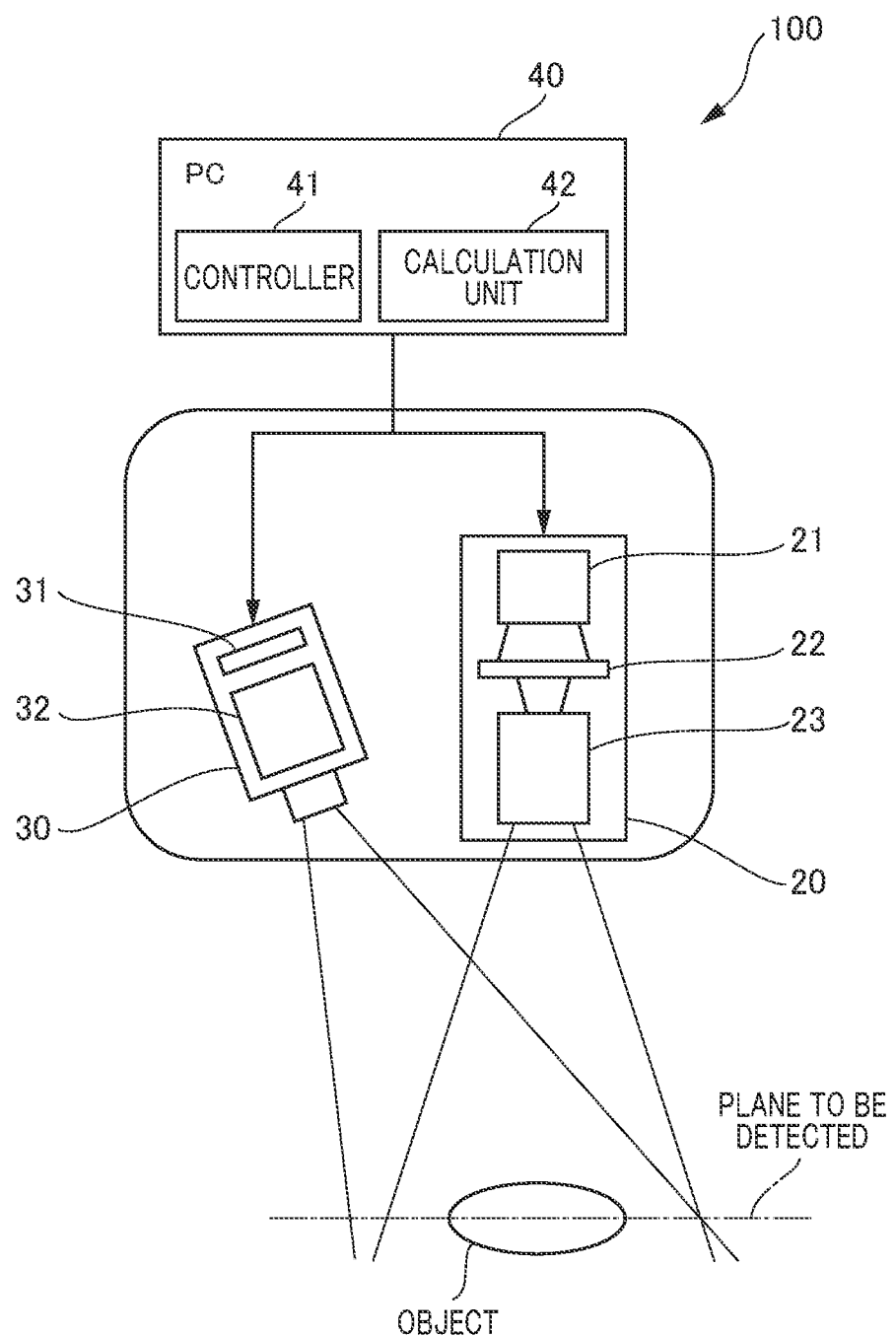
FIG. 1 shows a measurement apparatus using a holding apparatus according to an embodiment.

FIG. 1 shows a measurement apparatus using a holding apparatus according to an embodiment of the present disclosure. A measurement apparatus 100 measures a shape (for example, a 3D shape, a 2D shape, a position and an orientation) of an object to be measured (object) located on a plane to be detected using a pattern projection method. As shown in FIG. 1, the measurement apparatus 100 has a projection unit 20, an imaging unit 30, and a processing unit 40.

The projection unit 20 that includes, for example, a light source unit 21, a pattern generating unit 22, and a projection optical system 23, projects a predetermined pattern to the object to be measured. The light source unit 21 uniformly illuminates a pattern generated by the pattern generating unit 22 with light emitted from a light source (for example, Koehler illumination). The pattern generating unit 22 generates a pattern (pattern light), and the generated pattern is projected to the object to be measured. In the present embodiment, a digital micromirror device (DMD) capable of generating an arbitrary pattern is used. In addition, a liquid crystal on silicon (LCOS), or a mask on which a pattern is formed by chrome-plating a glass substrate can be used. The projection optical system 23 is an optical system that projects the pattern generated by the pattern generating unit 22 to the object to be measured.

The imaging unit 30 that includes, for example, an imaging element 31 and an imaging optical system 32, images the object to be measured and captures an image. The imaging optical system 32 is an image forming optical system for forming an image of the pattern projected to the object to be measured on the imaging element 31. The imaging element 31 is an image sensor including a plurality of pixels for imaging an object to be measured to which the pattern is projected. For example, a CMOS sensor, a CCD sensor or the like can be used as the imaging element 31.

The processing unit 40 finds the shape of the object to be measured based on the image captured by the imaging unit 30. The processing unit 40 includes a controller 41 and a calculation unit 42. The controller 41 controls operations of the projection unit 20 and the imaging unit 30, specifically, projection of the pattern to the object to be measured and imaging of the object to be measured to which the pattern is projected. The calculation unit 42 finds a luminance distribution from the captured image and calculates distance information. The luminance distribution may be found by the imaging unit 30. As a calculation method, for example, a spatial encoding method is used.

Figure 2:
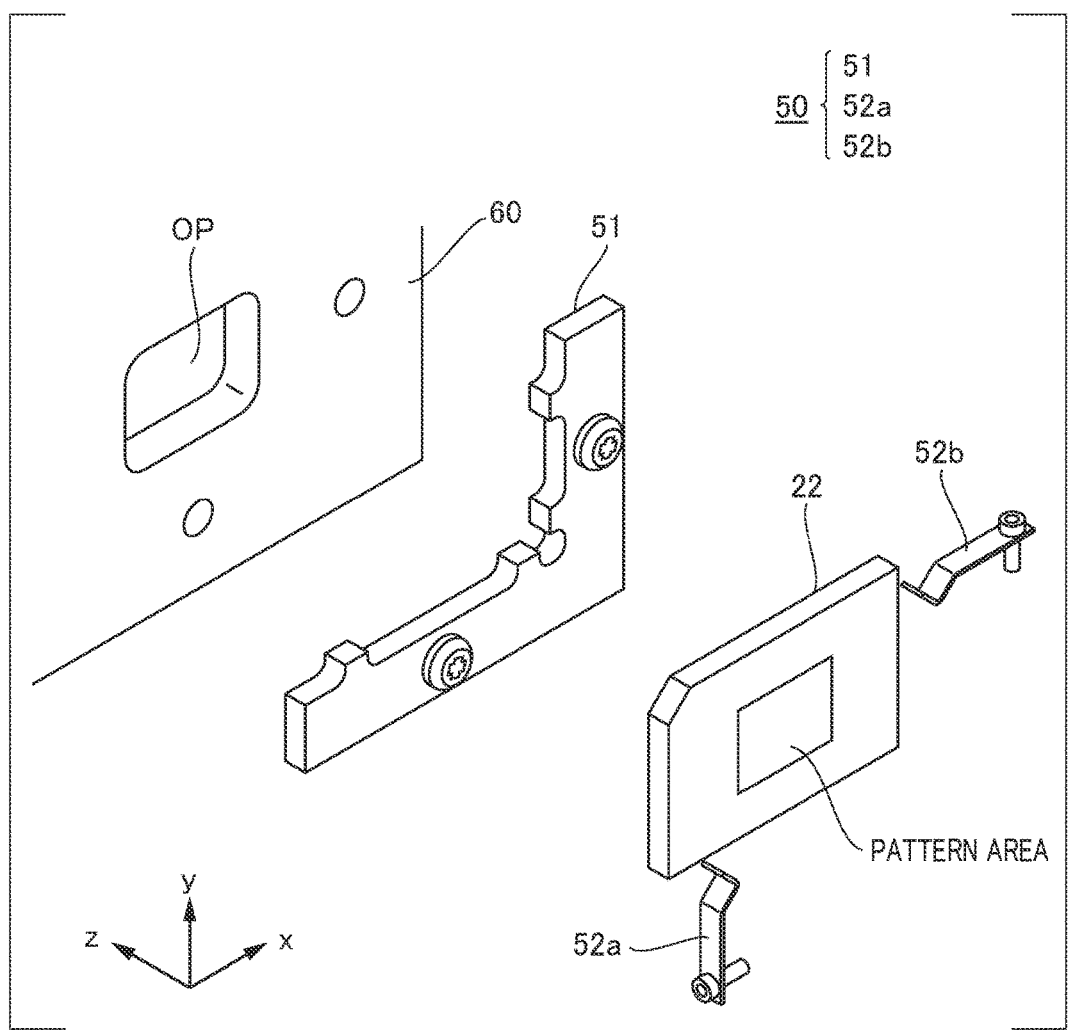
FIG. 2 shows a configuration of a holding apparatus for holding a pattern generating unit.

FIG. 2 shows a configuration of a holding apparatus for holding the pattern generating unit (optical element) 22. In FIG. 2 and the like, mutually orthogonal axes x and y are set as directions parallel to sides of a pattern area in the pattern generating unit 22, and a z-axis is set as a direction orthogonal to this x-y plane. In the present embodiment, the pattern generating unit 22 having a shape such as a thin rectangular parallelepiped (thin cuboid) is used. In the projection unit 20, a holding apparatus 50 is disposed such that the pattern generating unit 22, the light source unit 21 and the projection optical system 23 have a predetermined positional relationship. The holding apparatus 50 has a fixing member (positioning member) 51 and an elastic member 52. In the fixing member 51, at least one abutting surface (a protruding portion, a convex portion) on which a side of the pattern generating unit 22 abuts protrudes. In the present embodiment, the protruding portion abuts on the vicinity of a corner of the pattern generating unit 22. The elastic member 52 that is attached to the fixing member 51, biases the pattern generating unit 22 such that the pattern generating unit 22 abuts on the protruding portion. In the present embodiment, the elastic member 52 includes plate springs 52a and 52b. In addition, the holding apparatus 50 is fixed to a supporting member 60 provided on the projection unit 20. The supporting member 60 includes an opening OP having a shape to which the pattern area of the pattern generating unit 22 is exposed, at a position corresponding to the pattern area. Also, in the present embodiment, screws are used to attach the plate springs 52a and 52b to the fixing member 51 and fix the fixing member (the holding apparatus 50) to the supporting member 60.

The fixing member 51, the elastic member 52, and the supporting member 60 are made of, for example, aluminum (linear expansion coefficient: $23 \times 10^{-6}/°$ C.) from the point of view of costs and processability. Austenitic stainless steel such as SUS304 also can be used. In addition, the pattern generating unit 22 is made of a nonmetal, for example, alumina ceramic (linear expansion coefficient: $7 \times 10^{-6}/°$ C.).

Figure 3:
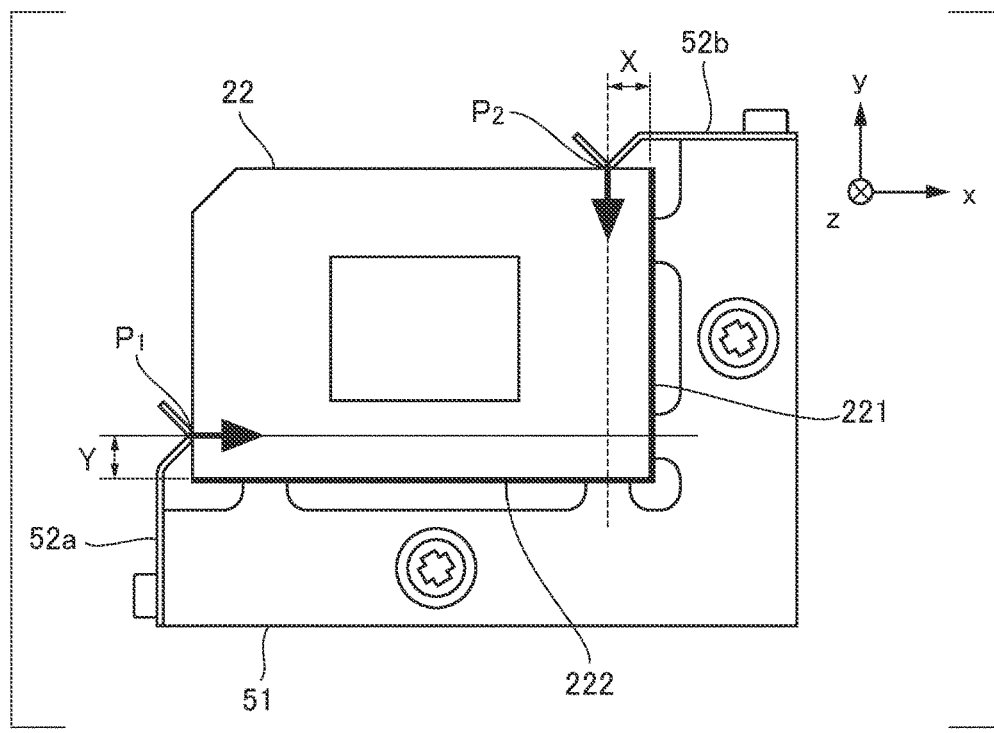
FIG. 3 shows a state in which a pattern generating unit abuts on and is fixed to a fixing member.

FIG. 3 shows a state in which the vicinity of the corner of the pattern generating unit 22 is biased by the elastic member 52 and abuts on and is fixed to the fixing member 51. The plate spring 52a biases the pattern generating unit 22 at a point $P_1$ on a surface opposite to a protruding portion so that a side 221 of the pattern generating unit 22 abuts on the protruding portion of the fixing member 51. Similarly, the plate spring 52b biases the pattern generating unit 22 at a point $P_2$ so that a side 222 of the pattern generating unit 22 abuts on the protruding portion of the fixing member 51. As shown in FIG. 3, the side 221 and the side 222 are adjacent to each other. This configuration prevents the pattern generating unit 22 from rotating due to a moment, since the fixing member 51 receives a biasing force due to the elastic member 52 on a surface opposite to a point at which the biasing force is applied. Also, in addition to the biasing force due to the elastic member 52, a moment may be generated due to shock from outside of the measurement apparatus 100. In the present embodiment, protruding portions are provided at a position where the corner of the pattern generating unit 22 in the vicinity of the point $P_1$ is putted between the point $P_1$ and the protruding portion and a position where the corner of the pattern generating unit 22 in the vicinity of the point $P_2$ is putted between the point $P_2$ and the protruding portion. Thus, the rotation due to the shock from the outside can be prevented.

According to changes in temperature of an environment in which an apparatus is installed, deformation amounts of the fixing member 51, the elastic member 52, the supporting member 60, and the pattern generating unit 22 are absorbed by elastic deformation of the plate springs 52a and 52b. This maintains accuracy in holding the pattern generating unit 22. In addition, this also can prevent damage to the pattern generating unit 22. However, due to the difference between linear expansion coefficients of the above members, a frictional force may be generated between the members. Due to the frictional force, the deformation amounts of the members may not be absorbed by the elastic deformation of the plate springs 52a and 52b. For example, if the environmental temperature returns to an initial temperature after the environmental temperature changes from the initial temperature to a certain temperature, the members may not return to positions at the initial temperature. This results in low accuracy (low reproducibility of a position of an object to be held) in holding the pattern generating unit 22.

Therefore, The present embodiment defines a position where the pattern generating unit 22 is biased, taking the frictional force due to the difference between the linear expansion coefficients into consideration. The position of the point $P_1$ is set to a position at a distance Y away from a position (the corner of the pattern generating unit 22) where the side 222 and a side on which the plate spring 52a applies a biasing force are connected. Similarly, the position of the point $P_2$ is set to a position at a distance X away from the corner of the pattern generating unit 22. For example, if the amount of the change in the environmental temperature is set as $\Delta t$ ° C., the linear expansion coefficient of the pattern generating unit 22 is set as $\alpha$, and the linear expansion coefficient of the supporting member 60, the fixing member 51, and the plate springs 52a and 52b is set as $\beta$. A linear expansion amount $\delta p$ of the pattern generating unit 22 at the point $P_1$ and a linear expansion amount $\delta s$ of the plate spring 52a are represented by $\delta p = \alpha \times \Delta t \times Y$ and $\delta s = \beta \times \Delta t \times Y$. Therefore, at the point $P_1$, a mutual deviation amount of $|\delta p - \delta s| = |\alpha - \beta| \times \Delta t \times Y$ is generated between the pattern generating unit 22 and the plate spring 52a. If a friction coefficient between the pattern generating unit 22 and the plate spring 52a is large, the mutual deviation amount may not be absorbed by the elastic deformation of the plate spring 52a.

Due to an influence of the frictional force, the deformation amount corresponding to the above mutual deviation amount at maximum is not absorbed by the elastic deformation but remains. For example, if $\Delta t = 45°$ C., $\alpha = 7 \times 10^{-6}/°$ C., $\beta = 23 \times 10^{-6}/°$ C., and an allowable value Z of the deformation amount is 3 μm. In this case, the distance Y at which the mutual deviation amount is not greater than the allowable value (threshold value) Z is calculated as $|\delta p - \delta s| = |\alpha - \beta| \times \Delta t \times Y \leq Z$, that is, $Z/(|\alpha - \beta| \times \Delta t) = 3 \times 10^{-6}$ m$/16 \times 10^{-6} \times 45 \geq Y$, and thus $Y \leq 4.16$ mm. Therefore, as the point $P_1$ is defined at a position at a distance of 4.16 mm or less away from the corner, it is possible to set the accuracy in holding (the reproducibility of the position of the object to be held) within an acceptable range (not greater than a threshold). This position is $\Delta t = 0$, that is, a position (initial position) before the temperature changes. This is similarly applied to the point $P_2$.

Also, if the linear expansion coefficients of the fixing member 51, the elastic member 52, and the supporting member 60 are different from each other, for example, a value corresponding to the linear expansion coefficient is obtained from an amount of change in position of the point $P_1$ before and after the environmental temperature changes and the amount of the change in the environmental temperature, and thus it is possible to calculate an appropriate position of the point $P_1$ in the same manner as in the above.

As described above, the holding apparatus of the present embodiment sets the position where the pattern generating unit 22 is biased to a position obtained from the difference between linear expansion coefficients of the pattern generating unit 22 and the elastic member 52, and the amount of the change in the environmental temperature, and thus can obtain an predetermined accuracy in holding. According to the present embodiment, a holding apparatus advantageous in reproducibility of a position of an object to be held, can be provided.

Figure 4:
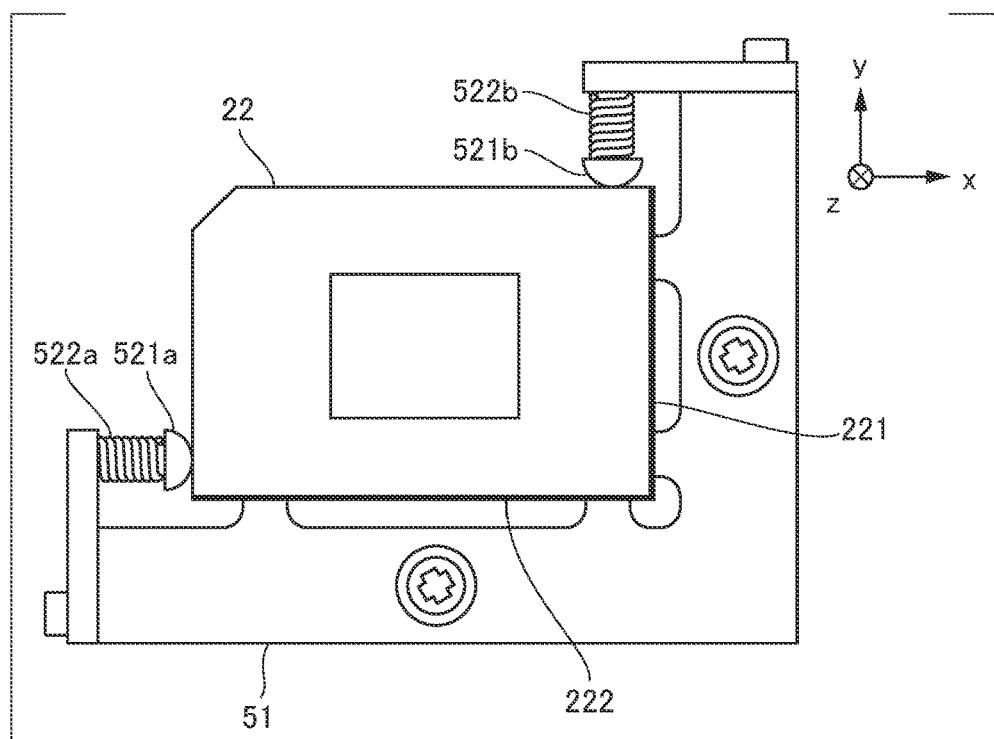
FIG. 4 shows an example of an elastic member for biasing a pattern generating unit.
Figure 5:
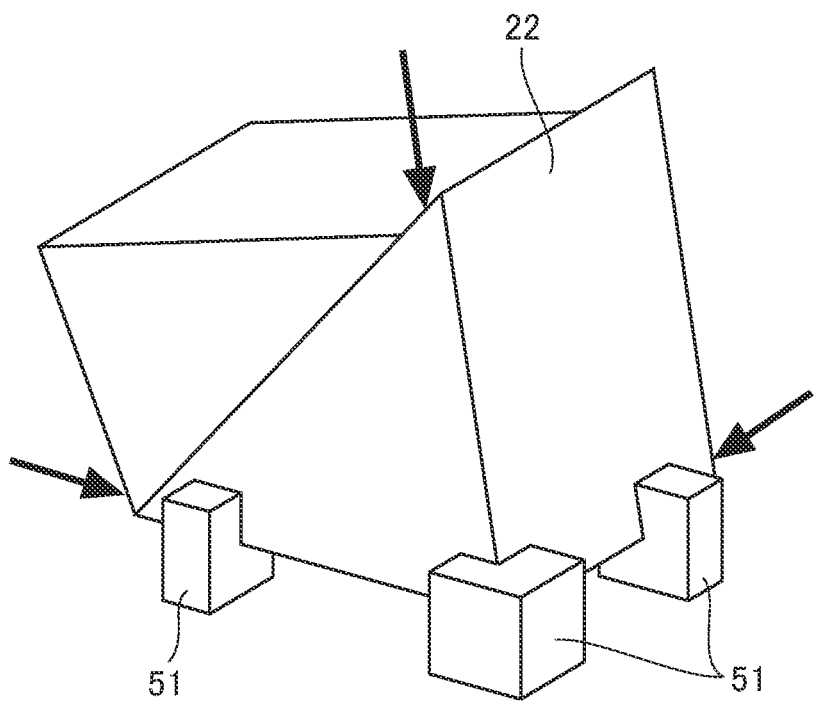
FIG. 5 shows an example of a pattern generating unit.
Figure 6:
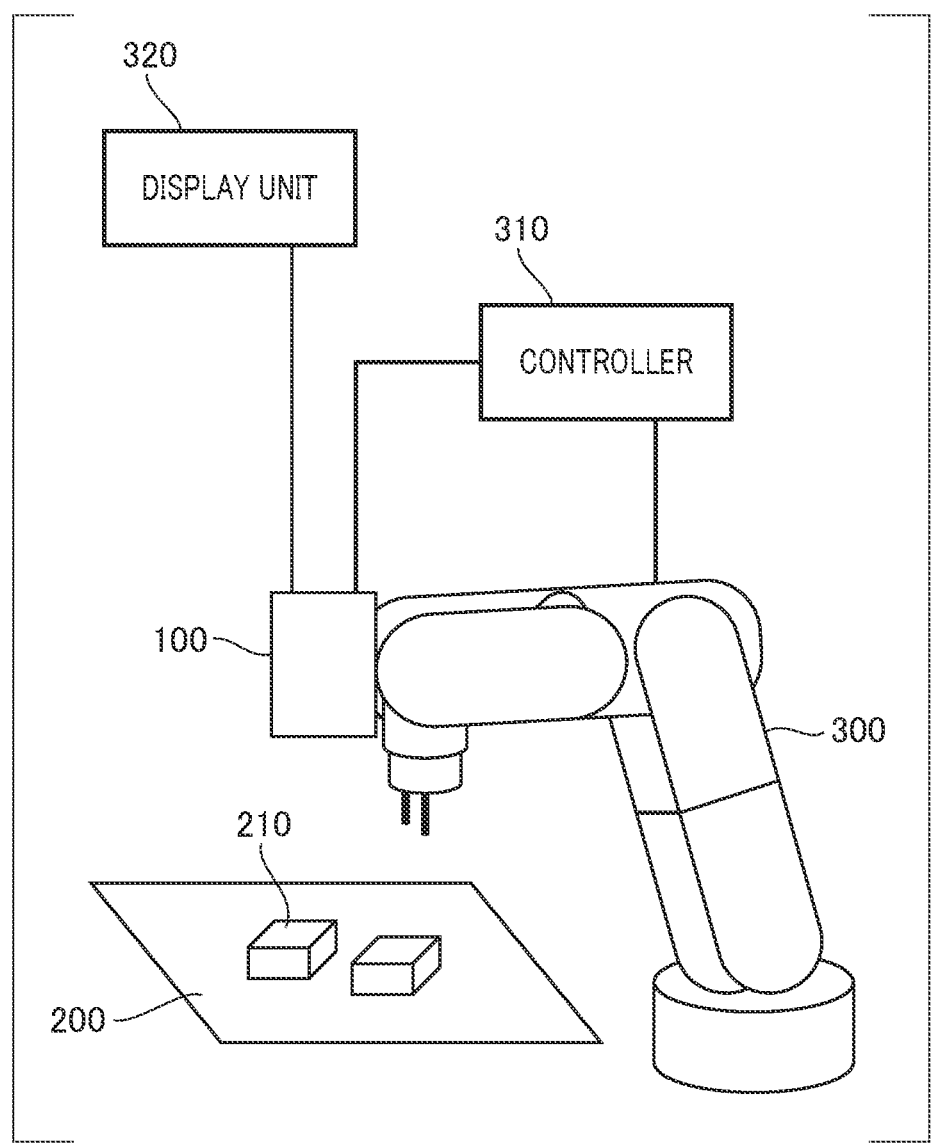
FIG. 6 is for explaining a control system as an application example of the holding apparatus.

Also, as shown in FIG. 4, a compression spring 522a including a pressing portion 521a and a compression spring 522b including a pressing portion 521b can be used as the elastic member 52, each of which contacts the side of the pattern generating unit 22. In addition, the pattern generating unit 22 is not limited to a member having a shape such as a thin rectangular parallelepiped, and may be, for example, a polyhedral member such as a prism as shown in FIG. 5. In this case, this element is biased in directions of arrows shown in FIG. 5. If the elastic member 52 biases the pattern generating unit 22 at a surface, the center of the surface or the center of gravity is set as a biasing position.

(Embodiment of Article Manufacturing Method)

The measurement apparatus including the above-described holding apparatus may be used while being supported by any support member. In the present embodiment, a description will be given of an example of a control system that is used while equipped in a robot arm (gripping device, holding device) 300 as shown in FIG. 8. The measuring apparatus 100 projects a pattern light onto an object to be detected 210, which is located on a supporting base 200, and images the object to be detected 210 to obtain the captured image. Sequentially, a controller of the measuring apparatus 100 or a controller 310 that has acquired image data from the controller of the measuring apparatus 100 finds a position and an orientation of the object to be detected 210, and then the controller 310 acquires information about the found position and orientation. The controller 310 controls the robot arm 300 by sending a drive command to the robot arm 300 based on the information (measurement result) about their position and orientation. The robot arm 300 holds the object to be detected 210 with a robot hand (gripping unit) or the like which is located at the tip thereof to move the object to be detected 210 translationally, rotationally, or the like. Furthermore, an article composed of a plurality of parts, such as an electronic circuit substrate and machine can be manufactured by installing (assembling) the object to be detected 210 in another part by using the robot arm 300. In addition, an article can be manufactured by processing the moved object to be detected 210. The controller 310 has a calculating unit such as a CPU and a storage unit such as a memory. Note that a display unit 320 (such as display) may display measurement data obtained by measurement with the measuring apparatus 100, the obtained image, or the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-088224, filed Apr. 26, 2016, which is hereby incorporated by reference wherein in its entirety.

What is claimed is:

1. A holding apparatus for holding a pattern generating unit, the holding apparatus comprising:
   a positioning member configured to position a first side of the pattern generating unit and a second side of the pattern generating unit, which are adjacent to each other;
   a first elastic member supported by the positioning member and configured to apply a biasing force to a position on a third side of the pattern generating unit opposite to the first side of the pattern generating unit; and
   a second elastic member supported by the positioning member and configured to apply a biasing force to a position on a fourth side of the pattern generating unit opposite to the second side of the pattern generating unit,
   wherein the pattern generating unit comprises a digital mirror device, a liquid crystal on silicon, or a mask which has a pattern,
   wherein the position on the third side at which the first elastic member applies the biasing force to the pattern generating unit is nearer to the second side than a pattern region of the pattern generating unit in a direction perpendicular to the second side, and
   wherein the position on the fourth side at which the second elastic member applies the biasing force to the pattern generating unit is nearer to the first side than the pattern region of the pattern generating unit in a direction perpendicular to the first side.

2. The holding apparatus according to claim 1, wherein a distance of an initial position on the third side at which the first elastic member applies the biasing force to the pattern generating unit from the second side of the pattern generating unit is designed by $Z/(|\alpha-\beta|\times\Delta t)$, where $\alpha$ is a linear expansion coefficient of the pattern generating unit, $\beta$ is a linear expansion coefficient of the first elastic member, $\Delta t$ is an amount of change in temperature, and $Z$ is a predetermined allowable value of a shift between the pattern generating unit and the first elastic member due to the change in temperature.

3. The holding apparatus according to claim 1, wherein a distance of an initial position on the fourth side at which the second elastic member applies the biasing force to the pattern generating unit from the first side of the pattern generating unit is designed by $Z/(|\alpha-\beta|\times\Delta t)$, where $\alpha$ is a linear expansion coefficient of the pattern generating unit, $\beta$ is a linear expansion coefficient of the second elastic member, $\Delta t$ is an amount of change in temperature, and $Z$ is a predetermined allowable value of a shift between the pattern generating unit and the second elastic member due to the change in temperature.

4. The holding apparatus according to claim 1, wherein the positioning member includes a convex portion for positioning at least one of the first side of the pattern generating unit and the second side of the pattern generating unit.

5. The holding apparatus according to claim 4, wherein the positioning member includes:
   a first convex portion at a same position as the position on the third side at which the first elastic member applies the biasing force in the direction perpendicular to the second side, and
   a second convex portion at a same position as the position on the fourth side at which the second elastic member applies the biasing force in the direction perpendicular to the first side.

6. The holding apparatus according to claim 1, wherein the elastic member is fixed to the positioning member.

7. The holding apparatus according to claim 1, wherein the elastic member includes a plate spring or a compression spring.

8. A measurement apparatus that comprises a pattern generating unit and performs measurement of an object by projecting a pattern onto the object via the pattern generating unit and imaging the object on which the pattern is projected, the apparatus comprising:
   a holding apparatus, defined in claim 1, for holding the pattern generating unit.

9. A system comprising:
a measurement apparatus defined in claim 8; and
a robot configured to perform movement of an object for which measurement has been performed by the measurement apparatus.

10. A method of manufacturing an article, the method comprising steps of:
performing movement of an object for which measurement has been performed by a measurement apparatus; and
processing the object, of which the movement has been performed, to manufacture the article,
wherein the measurement apparatus includes a pattern generating unit and performs measurement of the object by projecting a pattern onto the object via the pattern generating unit and imaging the object on which the pattern is projected, the apparatus including:
a holding apparatus for holding the pattern generating unit, the holding apparatus including:
a positioning member configured to position a first side of the pattern generating unit and a second side of the pattern generating unit, which are adjacent to each other;
a first elastic member supported by the positioning member and configured to apply a biasing force to a position on a third side of the pattern generating unit opposite to the first side of the pattern generating unit; and
a second elastic member supported by the positioning member and configured to apply a biasing force to a position on a fourth side of the pattern generating unit opposite to the second side of the pattern generating unit,
wherein the pattern generating unit comprises a digital mirror device, a liquid crystal on silicon, or a mask which has a pattern,
wherein the position on the third side at which the first elastic member applies the biasing force to the pattern generating unit is nearer to the second side than a pattern region of the pattern generating unit in a direction perpendicular to the second side, and
wherein the position on the fourth side at which the second elastic member applies the biasing force to the pattern generating unit is nearer to the first side than the pattern region of the pattern generating unit in a direction perpendicular to the first side.

* * * * *